J. G. KING.
FRYING PAN.
APPLICATION FILED MAR. 26, 1920.
1,396,848.
Patented Nov. 15, 1921.
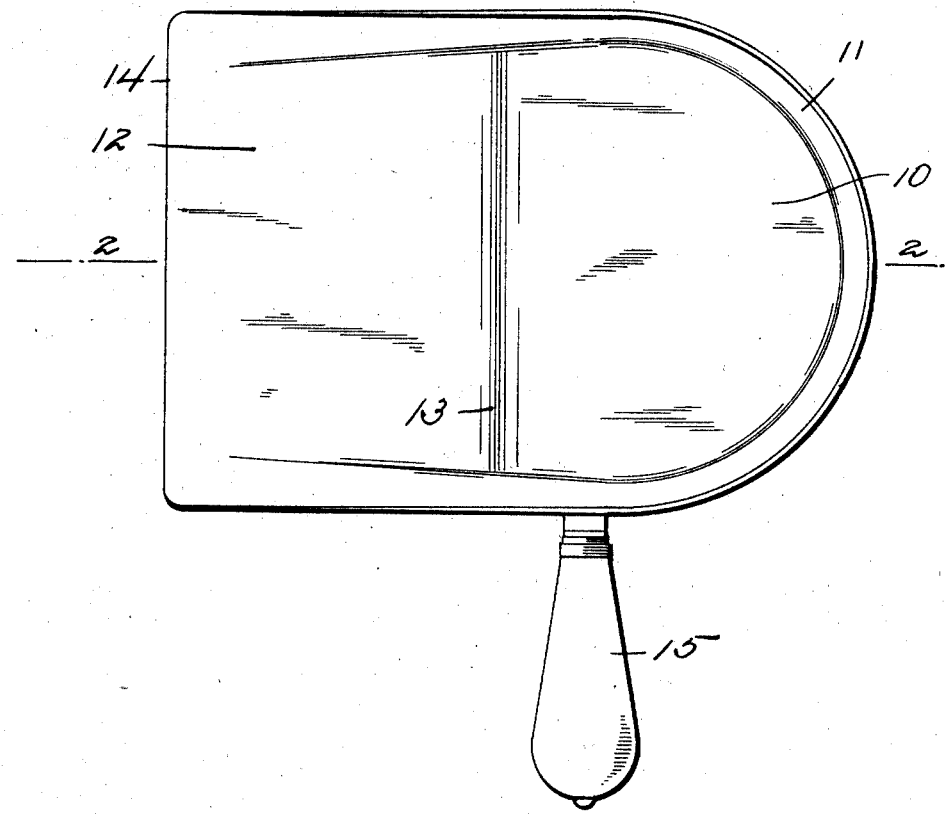
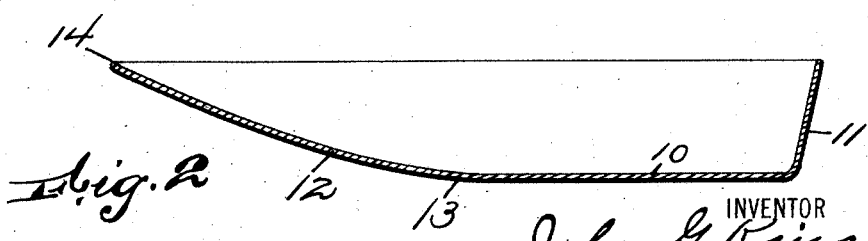

UNITED STATES PATENT OFFICE.

JOHN G. KING, OF MORRISTOWN, NEW JERSEY.

FRYING-PAN.

1,396,848.　　　　Specification of Letters Patent.　　Patented Nov. 15, 1921.

Application filed March 26, 1920. Serial No. 368,895.

*To all whom it may concern:*

Be it known that I, JOHN G. KING, a citizen of the United States, and a resident of Morristown, county of Morris, and State of New Jersey, have invented certain new and useful Improvements in Frying-Pans, of which the following is a specification.

This invention relates to an improved frying pan that is constructed particularly for frying articles that are apt to be broken or have their appearance spoiled by excessive handling or by over-turning and taking them from the pan, and is particularly adapted for frying such articles as eggs.

The frying pan is constructed so that sufficient surface is presented for the proper frying of eggs and the like, but what, for clearness, I will designate as the front of the pan, is inclined so that it presents not a too abrupt juncture with the bottom, merging therewith in a gentle curve and presenting a substantially smooth flat portion so that when it is tilted an egg or the like will slide along this delivery portion and be deposited on a plate or other article without any possibility of breaking it.

The invention is illustrated in the accompanying drawing, in which Figure 1 is a top view of my improved frying pan, and Fig. 2 is a section on line 2—2 in Fig. 1.

The frying pan has a substantially flat bottom 10, which is of any desired area and is provided with a flange 11 which extends around the back and the sides and is preferably continued toward the front, merging into the flat front portion 12, which is inclined upwardly from the bottom, merging therewith, as at 13, in a curve which is not abrupt, and having its front edge 14 preferably made straight and giving a wide front edge, so that food, such as eggs, which has been fried in the pan, when the pan is tilted passes down this delivery portion 12, so that it is not necessary to lift the material from the pan and over the flange, and in this way the frying pan not only becomes a cooking utensil, but also the means by which the material is delivered to a plate.

The frying pan is provided with a handle, which I prefer to place at the side, the handle 15 extending laterally and horizontally, or slightly inclined from the horizontal, and is disposed so that the weight of the pan is approximately balanced by the handle, so that when it is tilted there is but slight effort required.

I claim:

1. A frying pan having a substantially flat bottom with a flange at the back and sides and having its front part upwardly inclined to form a smooth and substantially flat portion which merges without abruptness into the bottom and is of substantially the same width for its entire length.

2. A frying pan having a substantially flat bottom with a flange at the back and sides and having its front part upwardly inclined to form a smooth and substantially flat portion which merges without abruptness into the bottom, the flange being gradually flattened toward the front so as to form a continuous straight front edge to the pan, said flat portion being without constriction so that flat, thin articles of considerable area can be delivered from the pan without material disarrangement.

3. A frying pan having a substantially flat bottom with a flange at the back and sides and having its front part upwardly inclined to form a smooth and substantially flat portion of equal width throughout which merges without abruptness into the bottom, and a handle projecting horizontally from the side of the pan at approximately the center.

In testimony that I claim the foregoing, I have hereto set my hand, this 24th day of March, 1920.

JOHN G. KING.